United States Patent
Kanamori et al.

(10) Patent No.: US 7,209,335 B2
(45) Date of Patent: Apr. 24, 2007

(54) SWITCHING POWER SUPPLY APPARATUS AND ELECTRIC APPLIANANCE THEREWITH

(75) Inventors: Atsushi Kanamori, Ikoma-Gun (JP); Kazufumi Oki, Kitakatsuragi-Gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 261 days.

(21) Appl. No.: 11/012,137

(22) Filed: Dec. 16, 2004

(65) Prior Publication Data

US 2005/0135036 A1    Jun. 23, 2005

(30) Foreign Application Priority Data

Dec. 19, 2003  (JP)  ............... 2003-422358

(51) Int. Cl.
*H02H 3/08* (2006.01)
*H02H 9/02* (2006.01)
*H02H 9/08* (2006.01)

(52) U.S. Cl. .................. 361/93.1; 361/93.9
(58) Field of Classification Search ............ 361/93.1, 361/93.9
See application file for complete search history.

(56) References Cited

FOREIGN PATENT DOCUMENTS

| JP | 11-332222 A | 11/1999 |
|---|---|---|
| JP | 2000-32744 A | 1/2000 |

*Primary Examiner*—Stephen W Jackson
*Assistant Examiner*—Dharti H. Patel
(74) *Attorney, Agent, or Firm*—Birch, Stewart, Kolasch & Birch, LLP

(57) ABSTRACT

A switching power supply apparatus produces an output voltage by smoothing a pulsating voltage obtained by switching an input direct-current voltage with a switching device. The switching power supply apparatus has a current detection circuit that outputs a detection current that varies in proportion to the switch current flowing through the switching device, an overcurrent detection circuit that detects an overcurrent by comparing the detection current with a set current previously set so as to correspond to the overcurrent detection level and that, on detection of an overcurrent, feeds a reset signal to a flip-flop for controlling the switching of the switching device to turn the switching device off, and a second current compensation circuit that superimposes a compensation current on the detection current fed to the overcurrent detection circuit to produce a compensated current.

19 Claims, 8 Drawing Sheets

FIG. 7A VOLTAGE CONVENTIONAL ART 
FIG. 7B VOLTAGE CONVENTIONAL ART 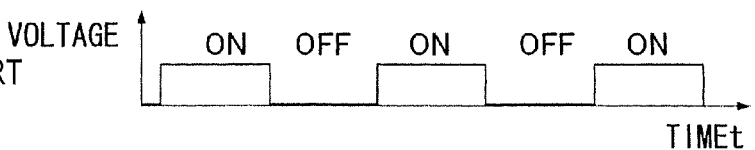
FIG. 7C CURRENT CONVENTIONAL ART 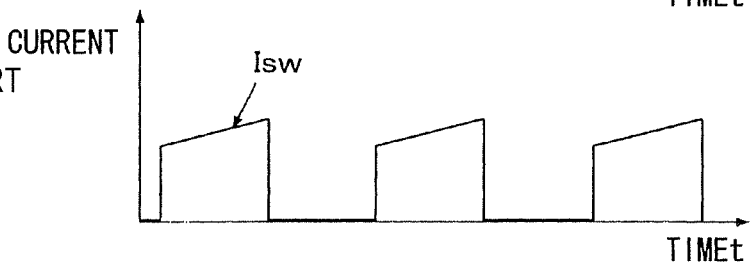
FIG. 7D CURRENT CONVENTIONAL ART 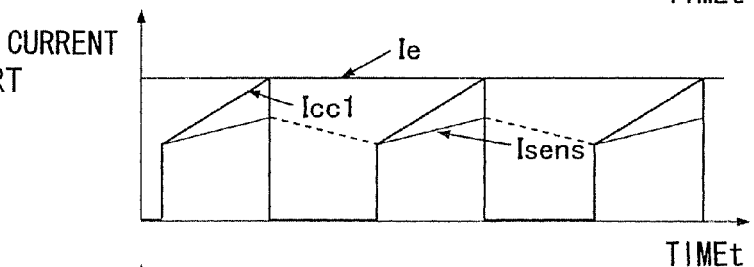
FIG. 7E CURRENT CONVENTIONAL ART 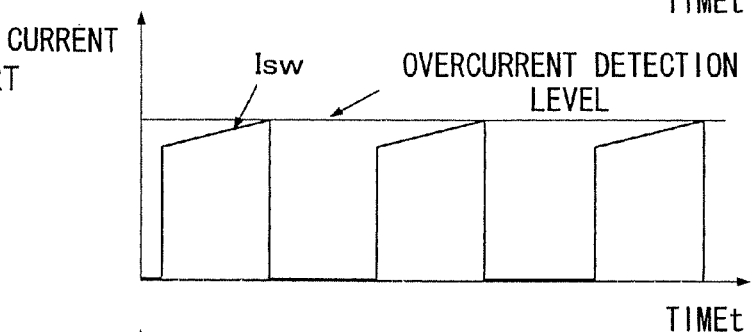
FIG. 7F CURRENT CONVENTIONAL ART 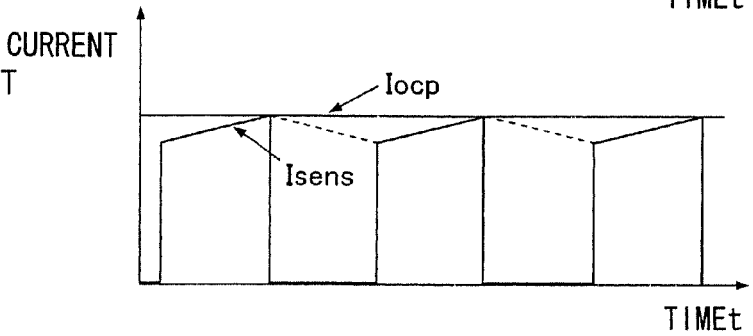

SWITCHING POWER SUPPLY APPARATUS AND ELECTRIC APPLIANANCE THEREWITH

This nonprovisional application claims priority under 35 U.S.C. § 119(a) on Patent Application No. 2003-422358 filed in Japan on Dec. 19, 2003, the entire contents of which are hereby incorporated by reference.

BACKGROUND OF THE INVENTION

1. Field of the Invention

The present invention relates to a switching power supply apparatus, and to an electric appliance incorporating it. More particularly, the present invention relates to a switching power supply apparatus provided with an overcurrent protection function whereby the output current is limited in an overloaded condition, and to an electric appliance incorporating such a switching power supply apparatus.

2. Description of Related Art

There has invariably been a strong demand for size and cost reduction in switching power supply apparatuses and in electric appliances incorporating them. In response, in switching power supply apparatuses, size and cost reduction has been attempted and achieved by reducing the inductances and capacitances of coils and capacitors. To reduce the inductances and capacitances of coils and capacitors, it is essential to increase the switching frequency. Thus, the switching frequency, which has conventionally been about several tens of kHz to 100 kHz, is now typically as high as about 1 MHz to 4 MHz.

In switching power supply apparatuses of the so-called current-control type, i.e., those that determine the on/off ratio (duty) of the switching device by comparing the output voltage with the switch current flowing through the switching device, it is known that a duty higher than 50% provokes unstable operation, causing low-frequency oscillation. When low-frequency oscillation occurs, the switching frequency usually drops to a fraction of its normal frequency, producing undesirable effects including increased ripples in the output voltage. To avoid this, in a current-control-type switching power supply apparatus, as shown in FIG. 6, it is customary to provide a current compensation circuit to ensure stable operation even with a duty higher than 50%.

FIG. 6 is a circuit block diagram showing the electrical configuration of a conventional switching power supply apparatus. In FIG. 6, a direct-current voltage fed from an unillustrated direct-current source is fed in via an input terminal IN. An input capacitor C1 for smoothing is connected between the input terminal IN and ground. The input terminal IN is connected through a current control portion 1 to one end of a switching device 2 such as a transistor, and the other end of the switching device 2 is connected to the cathode of a diode (rectifying device) D1 and to one end of a coil L1. The anode of the diode D1 is connected to ground. The other end of the coil L1 is connected to an output terminal OUT, and is also connected through an output capacitor C2 to ground. The other end of the coil L1 is also connected through serially connected voltage division resistors R1 and R2 to ground. Outside the switching power supply apparatus, a load 9 is connected between the output terminal OUT and ground.

The node between the voltage division resistors R1 and R2 is connected to the inverting input terminal (−) of a differential amplifier 3, and the non-inverting input terminal (+) of the differential amplifier 3 is connected to a reference voltage source 4. The output terminal of the differential amplifier 3 is connected to the inverting input terminal (−) of a comparator (comparison portion) 5, and the non-inverting input terminal (+) of the comparator 5 is connected to the current control portion 1. The output terminal of the comparator 5 is connected to the reset input terminal R of a flip-flop (switching control portion) 6, and the set input terminal S of the flip-flop 6 is connected to an oscillator (oscillation portion) 7. The output from the output terminal Q of the flip-flop 6 is fed, as a control signal, through a drive circuit 8 to the switching device 2. Thus, as the flip-flop 6 toggles between a set and a reset state, the switching device 2 turns on and off.

The current control portion 1 includes a current detection circuit (current detection portion) 11, an overcurrent detection circuit (overcurrent detection portion) 12, and a current compensation circuit 13. The current detection circuit 11 is connected between the input terminal IN and the switching device 2. The current detection circuit 11 monitors the switch current Isw that flows through the switching device 2, and outputs a detection current (detection signal) Isens that varies in proportion to the switch current Isw. The overcurrent detection circuit 12 compares the detection current Isens from the current detection circuit 11 with a set current (predetermined threshold value) Iocp previously set to correspond to the overcurrent detection level, and detects whether or not the switch current Isw is an overcurrent. The current compensation circuit 13 supplies a current for current compensation. The compensation current (first current compensation signal) from the current compensation circuit 13 is added to the detection current Isens from the current detection circuit 11, so that a compensated current Icc1 (first current-compensated signal) is fed to the non-inverting input terminal (+) of the comparator 5.

Next, the operation of this switching power supply apparatus configured as shown in FIG. 6 will be described. The direct-current voltage that is fed in via the input terminal IN is smoothed by the input capacitor C1 to become an input voltage Vin, which is then converted into a pulsating voltage by the switching operation of the switching device 2. When the switching device 2 is on, a current flows from the input terminal IN to the coil L1. This causes energy to be accumulated in the coil L1, and also causes energy to be fed to the load 9. On the other hand, when the switching device 2 is off, the energy accumulated in the coil L1 is fed through the diode D1 to the load 9. An output voltage Vo smoothed by the output capacitor C2 appears at the output terminal OUT, and this output voltage Vo is applied to the load 9, causing a load current Io to flow through the load 9.

The switching device 2 turns on and off as the flip-flop 6 toggles between different states. Specifically, through the drive circuit 8, the switching device 2 is so controlled as to turn on and off when the flip-flop 6 is in the set and reset states, respectively. FIGS. 7A to 7F are waveform diagrams in explanation of the operation of the switching power supply apparatus shown in FIG. 6. FIG. 7A shows the waveform of the pulse signal outputted from the oscillator 7. FIG. 7B shows the waveform of the output signal from the output terminal Q of the flip-flop 6 that turns the switching device 2 on and off. FIG. 7C shows the waveform of the switch current Isw in the normal condition. FIG. 7D shows the waveforms of the detection current Isens, the compensated current Icc1, and the error current (error signal) Ie in the normal condition. FIG. 7E shows the waveform of the switch current Isw in the overcurrent-protection-enabled condition. FIG. 7F shows the waveforms of the detection current Isens and the set current Iocp in the overcurrent-protection-enabled condition.

In FIGS. 7D and 7F, the values of the detection current Isens as observed at the moment that the switching device 2 turns from on to off and at the moment that it turns from off back to on are connected together by broken lines.

Receiving the pulse signal (FIG. 7A) from the oscillator 7, the flip-flop 6 is set at the trailing edges of the pulse signal, turning the switching device 2 on (FIG. 7B). On the other hand, the flip-flop 6 is reset when the signal from the comparator 5 turns to H (high) level, turning the switching device 2 off (FIG. 7B). As the switching device 2 turns on and off, a switch current Isw as shown in FIG. 7C flows through the switching device 2. Here, the control whereby the switching device 2 is turned off is achieved in the following manner.

As shown in FIG. 7D, the comparator 5 compares the compensated current Icc1, which is the sum of the detection current Isens from the current detection circuit 11 and the compensation current from the current compensation circuit 13, with the error current Ie from the differential amplifier 3. If the compensated current Icc1 is larger, the comparator 5 turns its output signal to H level, and thereby resets the flip-flop 6; if the error current Ie is larger, the comparator 5 turns its output signal to L (low) level so as not to reset the 6.

Here, the error current Ie from the differential amplifier 3 is a current commensurate with the error detected by comparing the feedback voltage Vadj, which is obtained by dividing the output voltage Vo with the voltage division resistors R1 and R2, with the reference voltage Vref from the reference voltage source 4. This error current Ie is compared with the switch current Isw to perform the switching of the switching device 2 so that the output voltage Vo is kept at a constant voltage commensurate with the reference voltage Vref. In this switching power supply apparatus of the current-control type, to ensure stable operation, fluctuations in the switch current Isw need to be made to converge. To achieve this, as shown in FIG. 7D, the slope of the compensated current Icc1 needs to be made steeper than the slope of the broken lines. For this purpose, the current compensation circuit 13 adds the compensation current, which increases with time, to the detection current Isens to make the slope of the compensated current Icc1 steeper.

Through this sequence of operations, even when the load 9 varies, the output voltage Vo is stably kept constant. For example, when the load 9 becomes higher, through the following sequence of operations, the output voltage Vo is stabilized. As the load 9 increases, the output voltage Vo decreases, then the error current Ie increases, and then the switch current Isw through the switching device 2 increases (with the duty kept constant) so that the peak value of the compensated current Icc1 increases (with the slope kept constant) and that the peak value of the detection current Isens increases (with the slope kept constant).

In this way, the switch current Isw increases with the load. To prevent the switch current Isw from becoming excessively large, the overcurrent detection circuit 12 performs overcurrent protection operation. As shown in FIG. 7F, the overcurrent detection circuit 12 compares the detection current Isens from the current detection circuit 11 with the set current Iocp that is previously set so as to correspond to the overcurrent detection level, and detects whether or not the switch current Isw is an overcurrent or not.

Specifically, when the detection current Isens becomes larger than the set current Iocp, the switch current Isw is judged to be an overcurrent, and thus the flip-flop 6 is fed with a reset signal so as to be reset. As a result, the switching device 2 is turned and kept off until the flip-flop 6 is set next time by the pulse signal from the oscillator 7. This limits the peak of the switch current Isw flowing through the switching device 2 (FIG. 7E), and thereby prevents an overcurrent from flowing through the switching device 2.

Japanese Patent Application Laid-Open No. H11-332222 discloses a DC/DC converter that includes a capacitor for driving a switch provided between input power and a load wherein the switch is kept closed continuously so long as the capacitor is not filly discharged. In this DC/DC converter, a coil is provided that is connected to the switch, and the duty of the switch is determined according to the difference between a detection signal obtained by detecting the current flowing through the coil and the output voltage or a reference voltage that is proportional to the output voltage. Moreover, two ramp currents are added to the detection signal to adjust the off-state period of the switch for the purpose of preventing the capacitor from being insufficiently charged.

Japanese Patent Application Laid-Open No. 2000-32744 discloses a DC/DC converter that includes a switch through which power is fed and an inductor provided between the switch and an output terminal wherein the switch is switched at regular time intervals irrespective of the current flowing through the inductor. In this DC/DC converter, when the current flowing through the inductor reaches a command value signal that is determined according to the output voltage, a flip-flop is reset so that the switch is turned off.

The conventional switching power supply apparatus shown in FIG. 6, however, has the following disadvantage. In the normal condition, the timing with which the switching device 2 is turned off is determined by comparing the compensated current Icc1, which is the sum of the detection current Isens from the current detection circuit 11 and the compensation current from the current compensation circuit 13, with the error current Ie from the differential amplifier 3. By contrast, in the overcurrent-protection-enabled condition, in which the overcurrent detection circuit 12 operates, the timing with which the switching device 2 is turned off is determined by comparing the detection current Isens from the current detection circuit 11 with the set current Iocp set in the overcurrent detection circuit 12. Thus, in this condition, the current compensation circuit 13 does not operate. As a result, when the switching operation is performed with a high duty, low-frequency oscillation occurs, causing the switching frequency to drop to a fraction of its normal frequency.

Now, the problems that arise when such low-frequency oscillation occurs will be described with reference to FIG. 8. FIG. 8 is a diagram showing the Vo–Io characteristic, i.e., the output voltage Vo plotted against the load current Io, as observed in the overcurrent-protection-enabled condition. In FIG. 8, the vertical axis represents voltage and the horizontal axis represents current, with broken lines indicating the characteristic in the normal condition and solid lines indicating the characteristic in the low-frequency-oscillation condition. Consider, for example, a case where the input voltage Vin equals 20 V, the output voltage Vo equals 15 V, the inductance L of the coil L1 equals 10 μH, the oscillation frequency fo of the oscillator 7 equals 1 MHz, an the overcurrent detection level Ic1 of the overcurrent detection circuit 12 equals 1.3 A.

The relationship between the load current Io and the switch current Isw is given by $$Io = Isw - (Vin - Vo)/(2Lfo) \times Vo/Vin$$

Since Isw equals Ic1, the maximum value of the load current Io, i.e., the load current Io at which overcurrent protection is enabled, equals 1.11 A in the normal condition. By contrast, when low-frequency oscillation occurs and the switching frequency drops to 250 kHz, 250 kHz is substituted as fo in the above formula, which thus gives the maximum load current as 0.55 A.

Here, assume that the switching power supply apparatus is operating at a load current Io of 1 A. So long as low-frequency oscillation does not occur, even if a transient overcurrent, for example a charge current to the output capacitor C2 at start-up, appears, since there is only one operating point, namely point A, at which Io equals 1 A in FIG. 8, as soon as the overcurrent condition disappears, 15 V is outputted as the output voltage. By contrast, in a condition where low-frequency oscillation may occur, there are two operating points, namely points A and B, where Io equals 1 A, and, if the switching power supply apparatus happens to operate at point B, a voltage lower than 15 V is outputted as the output voltage.

To avoid this inconvenience, the possibility of the switching frequency dropping to ¼ of its normal frequency needs to be taken into consideration by giving the coil four times the inductance otherwise necessary. This, however, leads to increased coil size and increased cost, and thus makes it impossible to make the switching power supply apparatus compact and inexpensive.

According to the conventional technique disclosed in Japanese Patent Application Laid-Open No. H11-332222 mentioned above, even when the difference between the input voltage fed in and the output voltage to be maintained is small, it is indeed possible to maintain the output voltage, but there is provided no overcurrent protection function for protecting the switch that performs switching. Thus, when a current larger than the current capacity of the switch continues to flow therethrough, as when a high load is connected, the switch may break down.

Japanese Patent Application Laid-Open No. 2000-32744 mentioned above also discloses additionally providing a circuit for forcibly resetting the flip-flop for driving the switch on detection of an abnormality (overcurrent) in the load current. Providing such a circuit indeed helps achieve overcurrent protection, but does not solve the problem of the switching frequency dropping as a result of low-frequency oscillation occurring when overcurrent protection is enabled.

SUMMARY OF THE INVENTION

In view of the conventionally encountered problems described above, it is an object of the present invention to provide a switching power supply apparatus that can be made compact and inexpensive and that can prevent low-frequency oscillation from occurring when overcurrent protection is enabled, and to provide an electric appliance incorporating such a switching power supply apparatus.

To achieve the above object, according to the present invention, a switching power supply apparatus is provided with: a switching device, having one end thereof connected to an input terminal to which a direct-current voltage is fed, for switching and thereby converting the direct-current voltage into a pulsating voltage; a coil, connected between the other end of the switching device and an output terminal, for smoothing and thereby converting the pulsating voltage into a direct-current voltage different from the direct-current voltage; an output capacitor, connected between the output terminal and ground, for smoothing the direct-current voltage from the coil and thereby producing an output voltage; and a rectifying device, connected between the node at which the switching device and the coil are connected together and ground, for permitting a current to flow through the coil during the off-state period of the switching device. This switching power supply apparatus is further provided with: a current detection portion that outputs a detection signal that varies in proportion to the current that flows, while increasing with time, through the switching device during the on-state period of the switching device; a comparison portion that compares an error signal indicating the difference of a feedback signal obtained by dividing the output voltage from a reference voltage with the detection signal; a switching control portion that turns the switching device on according to a pulse signal from an oscillation portion and that turns the switching device off according to the output obtained from the comparison portion when the detection signal becomes greater than the error signal; an overcurrent detection portion that detects an overcurrent in the current flowing through the switching device by comparing the detection signal with a predetermined threshold value and that, on detection of an overcurrent, turns the switching device off; a first current compensation portion that superimposes a first current compensation signal on the detection signal fed to the comparing portion to produce a first current-compensated signal; and a second current compensation portion that superimposes a second current compensation signal on the detection signal fed to the overcurrent detection portion to produce a second current-compensated signal. Here, variations in the current flowing through the switching device are made to converge as a result of the slopes of the first and second current-compensated signals being steeper than the slope of the line connecting together the values of the detection signal as observed when the switching device turns from on to off and when the switching device turns from off back to on.

With this configuration, in the normal condition, where the overcurrent detection portion does not operate, the switching operation of the switching device is performed based solely on the first current-compensated signal that is current-compensated by the first current compensation portion. Thus, even when the switching device is switched with a high duty, it does not cause low-frequency oscillation. On the other hand, in the overcurrent-protection-enabled condition, where the overcurrent detection portion operates, the overcurrent detection portion is operated based solely on the second current-compensated signal that is current-compensated by the second current compensation portion. Thus, even when the switching device is switched with a high duty, it does not cause low-frequency oscillation. In this way, both in the normal and overcurrent-protection-enabled conditions, even when the switching device is switched with a high duty, the switching frequency can be stabilized. This makes it possible to reduce the inductance and capacitance of the coil and capacitor used, and thereby to make the switching power supply apparatus compact and inexpensive.

According to the present invention, the second current compensation portion superimposes the second current compensation signal on the detection signal when the overcurrent detection portion detects an overcurrent. That is, in the normal condition, the second current compensation portion does not superimpose the second current compensation signal on the detection signal. This helps prevent the lowering of the overcurrent detection level resulting from a variation in the duty in the normal condition.

According to the present invention, the second current compensation portion subtracts from the detection signal a fixed signal and adds to the detection signal a signal that rises with time. This makes it possible to prevent low-frequency oscillation without varying the overcurrent detection level.

According to the present invention, the slopes of the first and second current compensation signals are equal. This makes it possible to perform current compensation as securely in the overcurrent-protection-enabled condition as in the normal condition.

According to the present invention, by using the switching power supply apparatus described above, it is possible to realize an electric appliance that operates stably even in the overcurrent-protection-enabled condition and that can be made compact and inexpensive.

BRIEF DESCRIPTION OF THE DRAWINGS

FIG. 7A is a diagram showing the waveform of the pulse signal outputted from the oscillator provided in the switching power supply apparatus shown in FIG. 6;

FIG. 7B is a diagram showing the waveform of the output signal from the output terminal of the flip-flop that turns on and off the switching device provided in the switching power supply apparatus shown in FIG. 6;

FIG. 7C is a diagram showing the waveform of the switch current as observed in the normal condition in the switching power supply apparatus shown in FIG. 6;

FIG. 7D is a diagram showing the waveforms of the detection current, the compensated current, and the error current (error signal) as observed in the normal condition in the switching power supply apparatus shown in FIG. 6;

FIG. 7E is a diagram showing the waveform of the switch current as observed in the overcurrent-protection-enabled condition in the switching power supply apparatus shown in FIG. 6;

FIG. 7F is a diagram showing the waveforms of the detection current and the set current as observed in the overcurrent-protection-enabled condition in the switching power supply apparatus shown in FIG. 6.

DETAILED DESCRIPTION OF PREFERRED EMBODIMENTS

Figure 1:
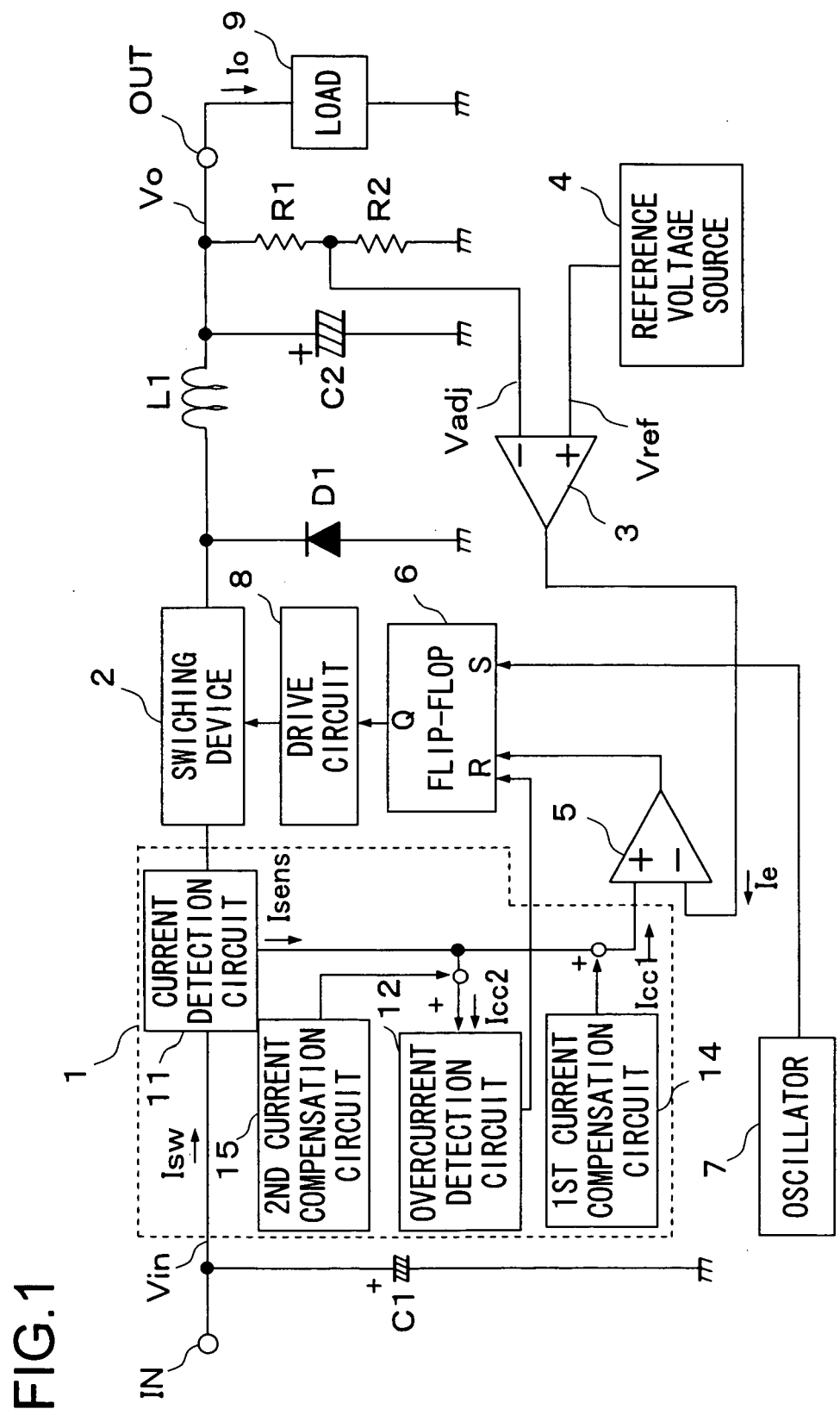
FIG. 1 is a circuit block diagram showing the electrical configuration of the switching power supply apparatus of a first embodiment of the invention.
Figure 6:
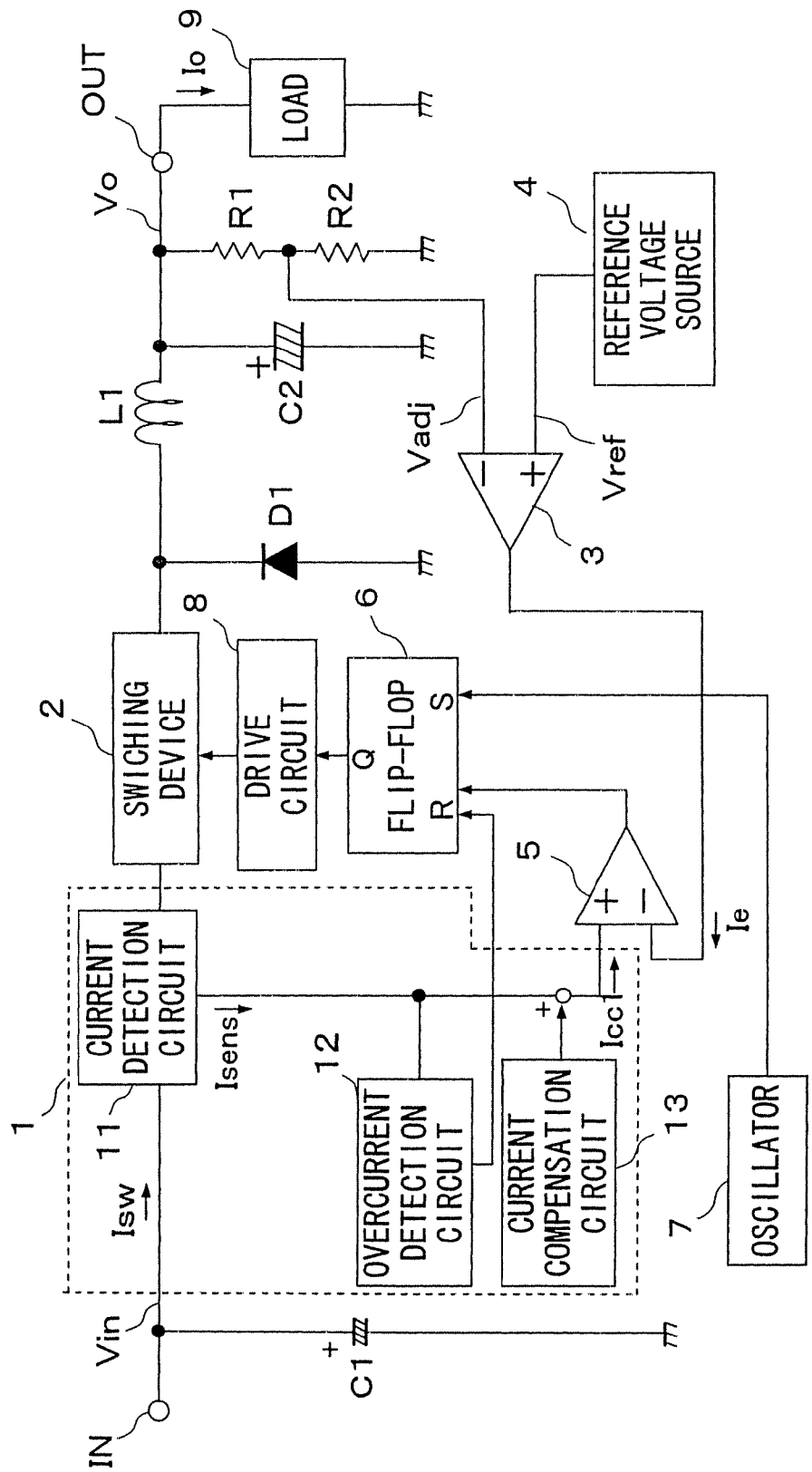
FIG. 6 is a circuit block diagram showing the electrical configuration of a conventional switching power supply apparatus.
Figure 8:
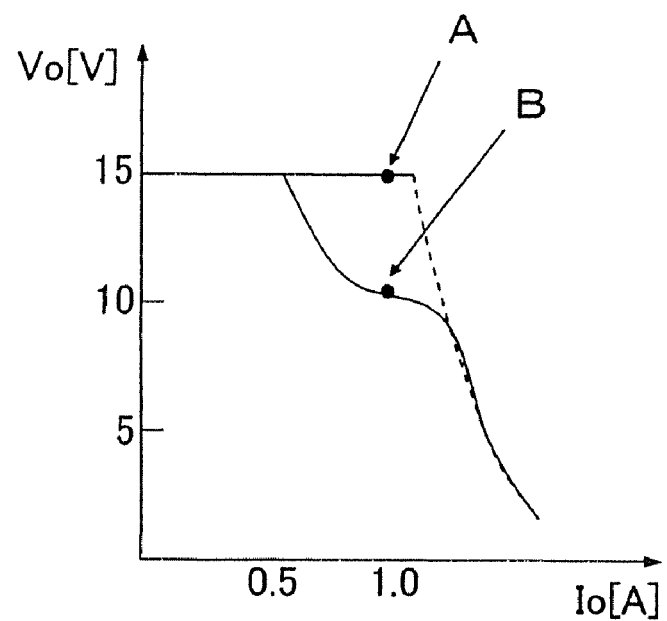
FIG. 8 is a diagram showing the characteristic of the output voltage with respect to the load current as observed in the overcurrent-protection-enabled condition in the switching power supply apparatus shown in FIG. 6.

Hereinafter, embodiments of the present invention will be described with reference to the accompanying drawings. FIG. 1 is a circuit block diagram showing the electrical configuration of the switching power supply apparatus of a first embodiment of the invention. In FIG. 1, such circuit components and blocks as find their counterparts in FIG. 6 are identified with common reference numerals and symbols, and their explanations will not be repeated. The switching power supply apparatus shown in FIG. 1 differs from the switching power supply apparatus shown in FIG. 6 in that, within the current control portion 1, a first current compensation circuit (first current compensation portion) 14 is provided instead of the current compensation circuit 13, and that a second current compensation circuit (second current compensation portion) 14 is additionally provided.

The first current compensation circuit 14 is configured and operates in similar manners to the current compensation circuit 13 shown in FIG. 6. The operation of the switching power supply apparatus shown in FIG. 1 in the normal condition, where the overcurrent detection circuit 12 does not operate, is similar to that of the switching power supply apparatus shown in FIG. 6 in the normal condition, and therefore no further description will be given of this operation. Now, a description will be given of the operation of the switching power supply apparatus shown in FIG. 1 in the overcurrent-protection-enabled condition.

In the overcurrent-protection-enabled condition, the output voltage Vo decreases, and thus the error current Ie fed to the non-inverting input terminal (+) of the comparator 5 increases. This keeps the output signal of the comparator 5 at L level, making it impossible for the comparator 5 to reset the flip-flop 6. In this state, the flip-flop 6 is reset by the overcurrent detection signal, serving as a reset signal, outputted from the overcurrent detection circuit 12.

The detection current Isens from the current detection circuit 11 varies in proportion to the switch current Isw that flows, while increasing with time, through the switching device during the on-state period of the switching device. A compensation current (second compensation signal) from the second current compensation circuit 15 is superimposed on this detection current Isens to produce a current-compensated current Icc2 (second current-compensated signal). The overcurrent detection circuit 12 compares this current-compensated current Icc2 with the set current Iocp previously set so as to correspond to the overcurrent detection level to detect whether or not the switch current Isw is an overcurrent or not.

Specifically, if the current-compensated current Icc2 is larger than the set current Iocp, the switch current Isw is judged to be an overcurrent, and thus the flip-flop 6 is fed with a reset signal so as to be reset. As a result, the switching device 2 is turned and kept off until the flip-flop 6 is set next time by the pulse signal from the oscillator 7. This limits the peak of the switch current Isw flowing through the switching device 2, and thereby prevents an overcurrent from flowing through the switching device 2.

In this way, in the overcurrent-protection-enabled condition, the overcurrent detection circuit 12 is operated with the current-compensated current Icc2. Thus, even with a high duty, variations in the switch current Isw are made to converge, and this prevents low-frequency oscillation from occurring. That is, even in the overcurrent-protection-enabled condition and in addition with a high duty, the switching frequency can be stabilized. This makes it possible to reduce the inductance and capacitance of the coil L1 and the output capacitor C2, and thereby to make the switching power supply apparatus compact and inexpensive.

Figure 2:
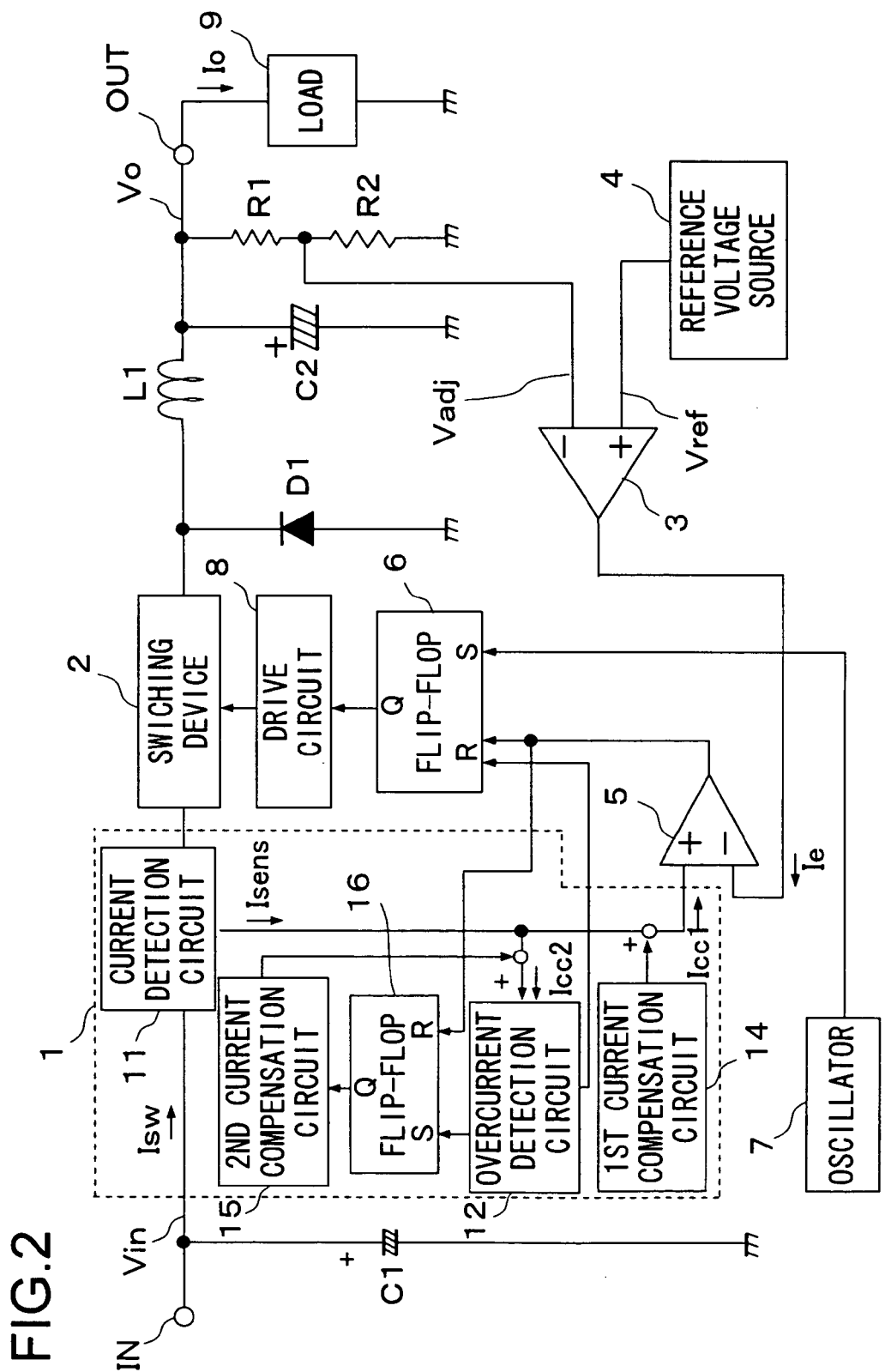
FIG. 2 is a circuit block diagram showing the electrical configuration of the switching power supply apparatus of a second embodiment of the invention.

FIG. 2 is a circuit block diagram showing the electrical configuration of the switching power supply apparatus of a second embodiment of the invention. In FIG. 2, such circuit components and blocks as find their counterparts in FIG. 1 are identified with common reference numerals and symbols, and their explanations will not be repeated. The switching power supply apparatus shown in FIG. 2 differs from the switching power supply apparatus shown in FIG. 1 in that, within the current control portion 1, a flip-flop (latch portion) 16 is additionally provided between the overcurrent detection circuit 12 and the second current compensation circuit 15.

The flip-flop 16 receives, at the set input terminal S thereof, the set signal (overcurrent detection signal) from the overcurrent detection circuit 12, and, at the reset input terminal R thereof, the output signal of the comparator 5. The output signal from the output terminal Q of the flip-flop 16 is fed to the second current compensation circuit 15. The second current compensation circuit 15 operates only when it is being fed with the output signal of the flip-flop 16, i.e., when the flip-flop 16 is set.

Thus, in the overcurrent-protection-enabled condition, the overcurrent detection circuit 12 compares the current-compensated current Icc2 with the set current Iocp, which corresponds to the overcurrent detection level, to detect whether or not the switch current Isw is an overcurrent is not. By contrast, in the normal condition, where overcurrent protection operation is not performed, the flip-flop 16 remains reset, keeping the operation of the second current compensation circuit 15 halted. Thus, the overcurrent detection circuit 12 compares the detection current Isens with the set current Iocp to detect whether or not the switch current Isw is an overcurrent or not. That is, if the detection current Isens is larger than the set current Iocp, the switch current Isw is judged to be an overcurrent. In this case, the flip-flop 6 is fed with a H-level reset signal so as to be reset, and in addition the flip-flop 16 is fed with a H-level set signal so as to be set.

As a result of the flip-flop 16 being set, the second current compensation circuit 15, which receives the output thereof, starts to operate. Specifically, the second current compensation circuit 15 superimposes a compensation current on the detection current Isens to produce a current-compensated current Icc2. As a result, the overcurrent detection circuit 12 operates with the current-compensated current Icc2, which is current-compensated. In this way, in the overcurrent-protection-enabled condition, even with a high duty, it is possible to prevent low-frequency oscillation from occurring.

When the overcurrent condition is removed and the normal condition is restored, i.e., when a reset signal from the comparator 5 is fed to the flip-flop 16, the flip-flop 16 is reset, halting the operation of the second current compensation circuit 15. Thus, the overcurrent detection circuit 12 now performs overcurrent detection on the basis of the detection current Isens, which is not current-compensated.

In the normal condition, by keeping the second current compensation circuit 15 halted in this way, it is possible to prevent the lowering of the overcurrent detection level resulting from a variation in the duty.

Figure 3:
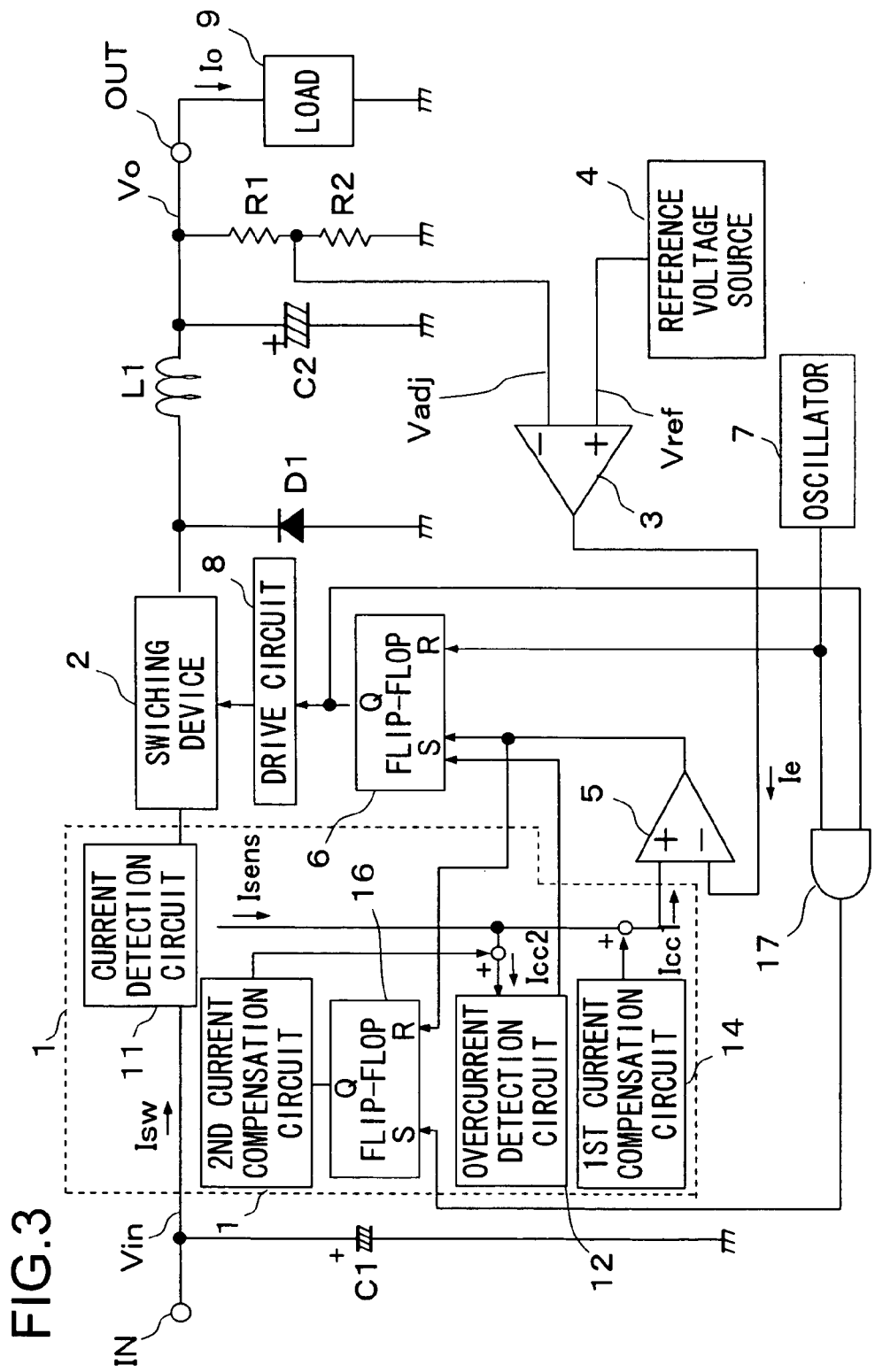
FIG. 3 is a circuit block diagram showing the electrical configuration of the switching power supply apparatus of a third embodiment of the invention.

FIG. 3 is a circuit block diagram showing the electrical configuration of the switching power supply apparatus of a third embodiment of the invention. In FIG. 3, such circuit components and blocks as find their counterparts in FIG. 2 are identified with common reference numerals and symbols, and their explanations will not be repeated. The switching power supply apparatus shown in FIG. 3 differs from the switching power supply apparatus shown in FIG. 2 in that the set signal fed from the overcurrent detection circuit 12 to the flip-flop 16 is not used and instead an AND gate (logic gate) 17 is additionally provided that outputs a set signal with which the flip-flop 16 is set.

The AND gate 17 is a two-input, one-output AND gate. The AND gate 17 receives, at one input, the pulse signal from the oscillator 7 and, at the other input, the output signal of the flip-flop 6. The output signal of the AND gate 17 is used as a set signal for the flip-flop 16.

In the overcurrent condition, the on-state period of the switching device 2 can be longer than the oscillation period of the oscillator 7. When this happens, in the switching power supply apparatus shown in FIG. 3, the overcurrent condition is recognized, and the second current compensation circuit 15 is made to operate. When the switching device 2 is on, the output signal of the flip-flop 6 is at H level. On the other hand, in the normal condition, the pulse signal from the oscillator 7 is at H level. That is, at the moment that the flip-flop 6 is set, the output signal of the flip-flop 6 is at L level (with the switching device 2 off). Thus, by calculating the logical product, i.e. AND, of the output of the flip-flop 6 and the output of the oscillator 7, it is possible to detect whether or not the on-state period of the switching device 2 is longer than the oscillation period of the oscillator 7.

Specifically, when the output of the flip-flop 6 and the output of the oscillator 7 are both on, the overcurrent condition is recognized. This turns the output signal of the AND gate 17 to H level, setting the flip-flop 16. This causes the second current compensation circuit 15 to start to operate so that a compensation current is superimposed on the detection current Isens to produce a current-compensated current Icc2. Thus, the overcurrent detection circuit 12 now operates with the current-compensated current Icc2, which is current-compensated. In this way, in the overcurrent-protection-enabled condition, even with a high duty, it is possible to prevent low-frequency oscillation from occurring.

In the switching power supply apparatuses of the embodiments described above, the current compensation performed by the second current compensation circuit 15 is achieved by subtracting from the detection current Isens a fixed current and adding to the resulting current a current that increases with time. Now, how this is achieved will be described with reference to FIGS. 4A to 4D.

Figure 4A:
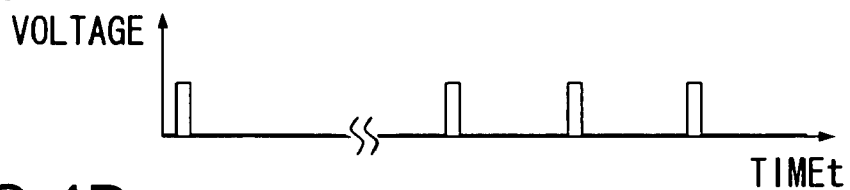
FIG. 4A is a diagram showing the waveform of the pulse signal outputted from the oscillator provided in the switching power supply apparatus shown in FIG. 2.
Figure 4B:
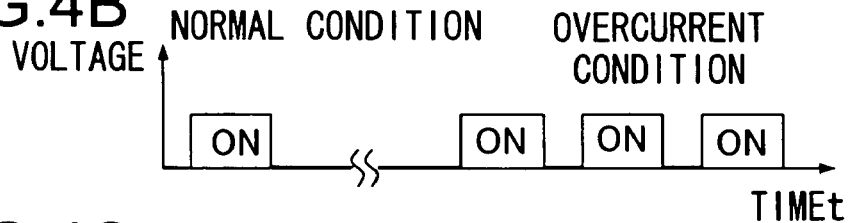
FIG. 4B is a diagram showing the waveform of the output signal from the output terminal of the flip-flop that turns on and off the switching device provided in the switching power supply apparatus shown in FIG. 2.
Figure 4C:
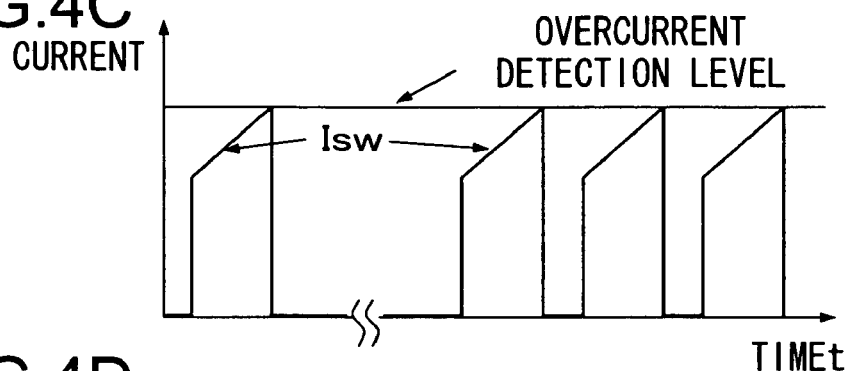
FIG. 4C is a diagram showing the waveform of the switch current as observed in the switching power supply apparatus shown in FIG. 2.
Figure 4D:
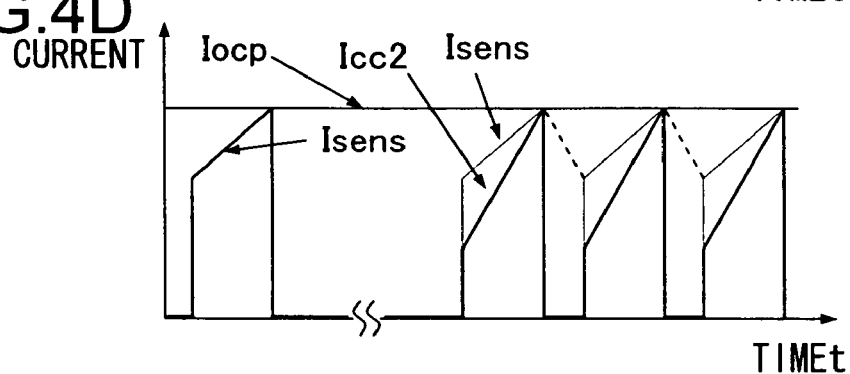
FIG. 4D is a diagram showing the waveforms of the detection current, the compensated current, and the set current as observed in the switching power supply apparatus shown in FIG. 2.

FIGS. 4A to 4D are waveform diagrams in explanation of the operation of the switching power supply apparatus shown in FIG. 2. FIG. 4A shows the waveform of the pulse signal outputted from the oscillator 7. FIG. 4B shows the waveform of the output signal from the output terminal Q of the flip-flop 6 that turns the switching device 2 on and off. FIG. 4C shows the waveform of the switch current Isw. FIG. 4D shows the waveforms of the detection current Isens, the compensated current Icc2, and the set current Iocp. In FIG. 4D, the values of the detection current Isens as observed at the moment that the switching device 2 turns from on to off and at the moment that it turns from off back to on are connected together by broken lines.

In the normal condition, where overcurrent protection operation is not performed, the flip-flop 16 remains reset, keeping the operation of the second current compensation circuit 15 halted. Thus, the overcurrent detection circuit 12 compares the detection current Isens with the current Iocp to detect whether or not the switch current Isw is an overcurrent.

Once the detection current Isens becomes equal to the set current Iocp, the flip-flop 16 is set, causing the second current compensation circuit 15 to start to operate. Thus, the current now fed to the overcurrent detection circuit 12 is the current-compensated current Icc2, which is obtained by subtracting from the detection current Isens a fixed current and adding to the resulting current a current that increases with time. In this way, it is possible to make the slope of the current-compensated current Icc2 steeper than the slope of the broken lines shown in FIG. 4D without varying the overcurrent detection level, and thereby to make variations in the current flowing through the switching device 2 to converge. Thus, in the overcurrent-protection-enabled condition, even with a high duty, it is possible to prevent low-frequency oscillation from occurring.

Figure 5:
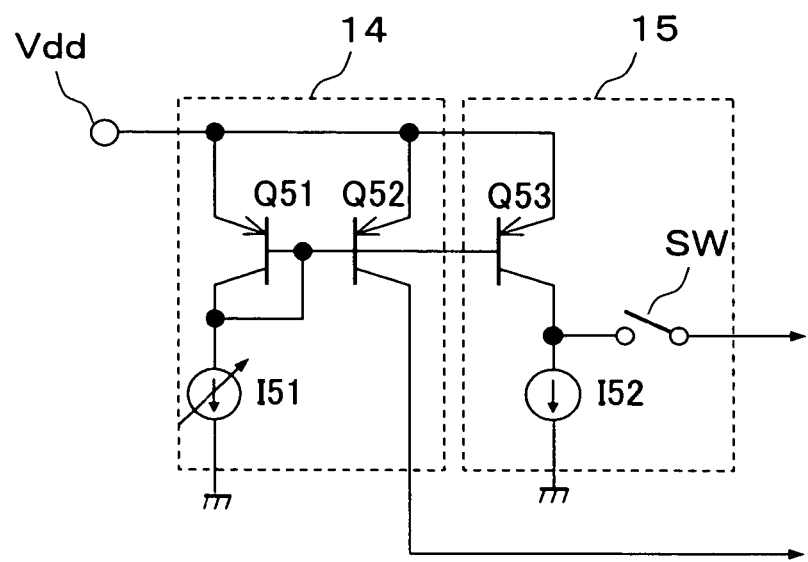
FIG. 5 is a circuit diagram showing a practical example of the circuit of the first and second current compensation circuits shown in any of FIGS. 1 to 3.

The second current compensation circuit 15, which operates in the manner described above, is configured, for example, as shown in FIG. 5. FIG. 5 is a circuit diagram showing a practical example of the first and second current compensation circuits 14 and 15 shown in any of FIGS. 1 to 3. The first current compensation circuit 14 shown in FIG. 5 is composed of PNP-type bipolar transistors Q51 and Q52 and a current source I51 that produces a current that increases with time. The bases of the bipolar transistors Q51 and Q52 are connected together. The emitters of the bipolar transistors Q51 and Q52 are both connected to a supplied voltage terminal Vdd, to which a constant voltage is fed. The base and collector of the bipolar transistor Q51 are connected together, and are then connected through the current source I51 to ground. The collector of the bipolar transistor Q52 is connected to the non-inverting input terminal (+) of the comparator 5 shown in one of FIGS. 1 to 3.

Configured as described above, the first current compensation circuit 14 forms a so-called current mirror circuit, operating in such a way that a current that mirrors the current that the current source I51 causes to flow between the emitter and collector of the bipolar transistor Q51 flows between the emitter and collector of the bipolar transistor Q52. Thus, the bipolar transistor Q52 outputs, from the collector thereof, the same current that increases with time, which current is then added to the detection current Isens.

On the other hand, the second current compensation circuit 15 shown in FIG. 5 is composed of a PNP-type bipolar transistor Q53, a constant current source I52, and a switch SW. The base of the bipolar transistor Q53 is connected to the base of the bipolar transistor Q51. The emitter of the bipolar transistor Q53 is connected to the supplied voltage terminal Vdd. The collector of the bipolar transistor Q53 is connected through the constant current source I52 to ground. That is, the second current compensation circuit 15 together with the first current compensation circuit 14 forms a current mirror circuit. The collector of the bipolar transistor Q53 is connected to one end of the switch SW, and the other end of the switch SW is connected to the input terminal, to which the detection current Isens is fed, of the overcurrent detection circuit 12 shown in one of FIGS. 1 to 3.

The switch SW is so controlled as to turn on and off when the flip-flop 16 shown in one of FIGS. 1 to 3 is set and reset, respectively. When the switch SW turns on, a current is extracted from the current that flows from the input terminal of the overcurrent detection circuit 12 shown in one of FIGS. 1 to 3 to the constant current source I52, and thereby a fixed current is subtracted from the detection current Isens. This realizes the current subtraction performed by the second current compensation circuit 15.

On the other hand, a current that mirrors the current that the current source I51 causes to flow between the emitter and collector of the bipolar transistor Q51 flows between the emitter and collector of the bipolar transistor Q53. Thus, the bipolar transistor Q53 outputs, from the collector thereof, the same current that increases with time, which current is then fed through the switch SW to the input terminal, to which the detection current Isens is fed, of the overcurrent detection circuit 12 shown in one of FIGS. 1 to 3 so as to be added to the detection current Isens. This realizes the current addition performed by the second current compensation circuit 15.

In this way, by producing the compensation current of the second current compensation circuit 15 by mirroring the compensation current of the first current compensation circuit 14, it is possible to make the slope of the compensated current Icc2 equal to the slope of the compensated current Icc1. Thus, even in the overcurrent condition, just as in the normal condition, it is possible to securely prevent low-frequency oscillation from occurring. Moreover, circuit sharing contributes to making the switching power supply apparatus simple and inexpensive.

The first and second current compensation circuits 14 and 15 shown in FIG. 5 are built with bipolar transistors. It is, however, also possible to build them with MOS transistors. For example, in cases where the switching frequency is as high as 500 kHz or more, or in circuits that contain many logic circuits as is the case with switching power supply apparatuses, using MOS transistors is more convenient.

In the embodiments described above, the addition and subtraction operations performed in the current control portion 1 and the comparison operation performed by the comparator 5 are all performed in terms of current. It is, however, also possible to perform these addition, subtraction, and comparison operations in terms of voltage instead. The first and second current compensation circuits 14 and 15 shown in FIG. 5 are so configured as to add and subtract currents. It is, however, also possible to configure them so as to deal with voltages instead of currents, i.e., so as to add and subtract voltages by the use of voltage amplifiers.

As described above, in a switching power supply apparatus according to the invention, not only in the normal condition but also in the overcurrent-protection-enabled condition, the overcurrent detection circuit 12 is operated with the current-compensated current Icc2, which is current-compensated. Thus, even with a high duty, it is possible to prevent low-frequency oscillation from occurring. That is, in the overcurrent-protection-enabled condition, even with a high duty, the switching frequency can be stabilized. This makes it possible to reduce the inductance and capacitance of the coil L1 and the output capacitor C2, and thereby to make the switching power supply apparatus compact and inexpensive.

By incorporating a switching power supply apparatus according to the present invention in an electric appliance that uses a switching power supply apparatus, or in a universal power supply, it is possible to realize a compact, inexpensive electric appliance or universal power supply. In particular in electronic appliances such as car-mounted appliances as exemplified by car audio systems, audio-visual appliances as exemplified by television monitors, liquid crystal display television monitors, and DVD video recorders, and PC peripheral devices as exemplified by CD-ROM drives, CD-R drives, and DVD drives, switching power supply apparatuses according to the present invention can very effectively be incorporated.

It should be understood that the present invention may be implemented in any other manner than specifically described above, and many modifications and variations are possible in the details of any part of its actually practiced configuration within the scope and the spirit of the present invention.

What is claimed is:

1. A switching power supply apparatus including:
   a switching device, having one end thereof connected to an input terminal to which a direct-current voltage is fed, for switching and thereby converting the direct-current voltage into a pulsating voltage;
   a coil, connected between another end of the switching device and an output terminal, for smoothing and thereby converting the pulsating voltage into a direct-current voltage different from the direct-current voltage;
   an output capacitor, connected between the output terminal and ground, for smoothing the direct-current voltage from the coil and thereby producing an output voltage; and
   a rectifying device, connected between a node at which the switching device and the coil are connected together and ground, for permitting a current to flow through the coil during an off-state period of the switching device,
   wherein the switching power supply apparatus comprises:
   a current detection portion that outputs a detection signal that varies in proportion to a current that flows, while increasing with time, through the switching device during an on-state period of the switching device;
   a comparison portion that compares an error signal indicating a difference of a feedback signal obtained by dividing the output voltage from a reference voltage with the detection signal;
   a switching control portion that turns the switching device on according to a pulse signal from an oscillation portion and that turns the switching device off according to an output obtained from the comparison portion when the detection signal becomes greater than the error signal;
   an overcurrent detection portion that detects an overcurrent in the current flowing through the switching device by comparing the detection signal with a predetermined threshold value and that, on detection of an overcurrent, turns the switching device off;
   a first current compensation portion that superimposes a first current compensation signal on the detection signal fed to the comparing portion to produce a first current-compensated signal; and
   a second current compensation portion that superimposes a second current compensation signal on the detection signal fed to the overcurrent detection portion to produce a second current-compensated signal,
   wherein a variation in the current flowing through the switching device is made to converge as a result of slopes of the first and second current-compensated signals being steeper than a slope of a line connecting together the values of the detection signal as observed when the switching device turns from on to off and when the switching device turns from off back to on.

2. The switching power supply apparatus of claim 1, wherein the second current compensation portion superimposes the second current compensation signal on the detection signal when the overcurrent detection portion detects an overcurrent.

3. The switching power supply apparatus of claim 1, further comprising:
   a latch portion that is set by an overcurrent detection signal outputted from the overcurrent detection portion on detecting an overcurrent and that is reset by an output obtained from the comparison portion when the detection signal becomes greater than the error signal,
   wherein the second current compensation portion superimposes the second current compensation signal on the detection signal when the latch portion is set.

4. The switching power supply apparatus of claim 1, wherein the second current compensation portion superimposes the second current compensation signal on the detection signal when the on-state period of the switching device is longer than a period of the pulse signal from the oscillation portion.

5. The switching power supply apparatus of claim 1, further comprising:
   a logic gate that outputs an AND of the pulse signal from the oscillation portion and a control signal that the switching control portion feeds to the switching device to turn the switching device on; and
   a latch portion that is set by an output of the logic gate and that is reset by an output obtained from the comparison portion when the detection signal becomes greater than the error signal,
   wherein the second current compensation portion superimposes the second current compensation signal on the detection signal when the latch portion is set.

6. The switching power supply apparatus of claim 1, wherein the second current compensation portion subtracts from the detection signal a fixed signal and adds to the detection signal a signal that rises with time.

7. The switching power supply apparatus of claim 2, wherein the second current compensation portion subtracts from the detection signal a fixed signal and adds to the detection signal a signal that rises with time.

8. The switching power supply apparatus of claim 3, wherein the second current compensation portion subtracts from the detection signal a fixed signal and adds to the detection signal a signal that rises with time.

9. The switching power supply apparatus of claim 4, wherein the second current compensation portion subtracts from the detection signal a fixed signal and adds to the detection signal a signal that rises with time.

10. The switching power supply apparatus of claim 5, wherein the second current compensation portion subtracts from the detection signal a fixed signal and adds to the detection signal a signal that rises with time.

11. The switching power supply apparatus of claim 1, wherein the slopes of the first and second current compensation signals are equal.

12. The switching power supply apparatus of claim 2, wherein the slopes of the first and second current compensation signals are equal.

13. The switching power supply apparatus of claim 6, wherein the slopes of the first and second current compensation signals are equal.

14. The switching power supply apparatus of claim 7, wherein the slopes of the first and second current compensation signals are equal.

15. The switching power supply apparatus of claim 11, wherein the second current compensation portion is built as a current mirror circuit that mirrors the first current compensation signal or as a voltage amplifier that generates a voltage equal to the first current compensation signal.

16. The switching power supply apparatus of claim 12, wherein the second current compensation portion is built as a current mirror circuit that mirrors the first current compensation signal or as a voltage amplifier that generates a voltage equal to the first current compensation signal.

17. The switching power supply apparatus of claim 13, wherein the second current compensation portion is built as a current mirror circuit that mirrors the first current compensation signal or as a voltage amplifier that generates a voltage equal to the first current compensation signal.

18. The switching power supply apparatus of claim 14, wherein the second current compensation portion is built as a current mirror circuit that mirrors the first current compensation signal or as a voltage amplifier that generates a voltage equal to the first current compensation signal.

19. An electric appliance comprising the switching power supply apparatus of claim 1.

* * * * *